US006959439B1

(12) United States Patent
Boike

(10) Patent No.: US 6,959,439 B1
(45) Date of Patent: Oct. 25, 2005

(54) SYSTEM INTERFACE ABSTRACTION LAYER

(75) Inventor: David C. Boike, Cullman, AL (US)

(73) Assignee: Mindspeed Technologies, Newport Beach, CA (US)

(*) Notice: Subject to any disclaimer, the term of this patent is extended or adjusted under 35 U.S.C. 154(b) by 0 days.

(21) Appl. No.: 09/410,150

(22) Filed: Sep. 30, 1999

(51) Int. Cl.[7] .................................... G06F 13/00
(52) U.S. Cl. .................................... 719/326; 719/321
(58) Field of Search ......... 709/321–327; 719/321–327

(56) References Cited

U.S. PATENT DOCUMENTS 6,157,965 A * 12/2000 Mohammed et al. .......... 710/8
6,233,624 B1 * 5/2001 Hyder et al. ................ 719/327
6,253,255 B1 * 6/2001 Hyder et al. ................ 719/321
6,366,656 B1 * 4/2002 Lee et al. ................... 379/198
6,470,397 B1 * 10/2002 Shah et al. ................. 709/250
6,473,803 B1 * 10/2002 Stern et al. ................. 709/238
6,633,929 B1 * 10/2003 Hyder et al. .................. 710/62
6,757,744 B1 * 6/2004 Narisi et al. ................ 709/250
6,779,185 B1 * 8/2004 Roukbi et al. .............. 719/321

OTHER PUBLICATIONS

Microsoft. Microsoft Windows NT Version 4.0 Device Driver Kit. 1985-96.*
3Tech. "NDIS Concepts." 3Com Technical Journal. Winter 1991.*
3Com Corporation/Microsoft Corportation. "Network Driver Interface Specification Version 2.0.1". Oct. 5, 1990.*
*Introduction to NDIS 5.0*, Microsoft Corporation, ©1999.
*Network Driver Interface Specification (NDIS) and the Role of Digital Technology*, Digital Technology, Aug. 25, 1999.
*Windows Driver Model (WDM) Device Drivers*, Chris Cant, PHD Computer Consultants, ©1998.
*Writing Windows NT4 Device Drivers*, Chris Cant, PHD Computer Consultants, ©1997.

* cited by examiner

*Primary Examiner*—Lewis A. Bullock, Jr.
(74) *Attorney, Agent, or Firm*—Godwin Gruber, LLP; Christopher J. Rourk

(57) ABSTRACT

A communications card provides a miniport driver including a system interface abstraction layer (SIAL) that eliminates operating system (OS) specific and platform specific semantics from communication paths between a driver and the rest of the communications system. The SIAL provides a layer of software that connects an unspecified number of messaging channels to a single interface. The SIAL provides a message controller that is responsible for routing messages between various internal and external entities and contains multiple installable components, an operating system component which provides OS functions for the installable components and a platform module that supplies platform specific functions to the installable components.

19 Claims, 4 Drawing Sheets

SYSTEM INTERFACE ABSTRACTION LAYER

BACKGROUND

1. Field of the Invention

The present invention generally relates to a driver architecture and, more particularly, to a system interface abstraction layer.

2. Description of the Related Art

One major issue for communications systems is support for peripheral devices. Most communications systems, from the low end to the high end, have an ever increasing array of possible peripheral devices such as modems, printers, plotters, fax machines and scanners. Not only new devices but new device types are frequently developed. Each specific type of device has its own memory, I/O and management requirements, and, often, two devices of the same type can have different requirements as well. In the face of this increasing complexity, much time and expense is expended by programmers and hardware designers to ensure that new devices and new device types are compatible with old devices and types. Often a new device may offer a feature that is simply not supported by the existing hardware and software, thus preventing the new device from fully utilizing all its features.

Typically, a new peripheral device, a new class of peripheral devices, a new processing card or a new type of processor is integrated into a communications system with drivers that provide code necessary to send commands to and receive replies or data directly from the operating system. Much of the code necessary for integration duplicates older code written for other devices, classes, cards or processors. This duplication may even extend across code for devices, classes, cards and processors, particularly if the code is designed to access commonly used features of an operating system or software module.

One example of an attempt to deal with this issue is the Network Driver Interface Specification (NDIS) written by the Microsoft Corporation of Redmond, Wash. NDIS defines a common software module interface for a network protocol stack which provides for network communications, adapter drivers which provide media access control (MAC), and protocol managers which enable the protocol stack and the MAC to cooperate. NDIS allows Microsoft® Windows modules, which implement different connectionless protocol stacks such as TCP/IP and IPX/SPX, to access different network hardware types such as Ethernet and token ring in a uniform manner. NDIS enables these functions by implementing a NDIS miniport interface.

SUMMARY OF THE INVENTION

Briefly, a communications system provides a system interface abstraction layer (SIAL) or system driver interface that eliminates operating system (OS) specific and platform specific semantics from communication paths between a driver and the rest of the communications system. Basic software messaging is thus simplified without changing either operating system or platform specific library functions.

A software message may originate from internal or external driver entities. Each message source typically may have a unique set of semantics for communicating to a message destination or target module. The SIAL isolates the source of a software message from the OS.

Each unique path between a message source and a message destination can be referred to as a message channel or path. The SIAL serves as a set of function calls between message sources and destination modules. The SIAL, which can be a layer of software within a miniport driver, supports a plurality of messaging channels.

The SIAL provides a message controller that is responsible for routing messages between various internal and external entities. The message controller includes a plurality of installable components with data conversion and command conversion routines for the plurality of messaging channels. Each installable component services a particular messaging channel. The SIAL also provides an operating system interface which provides OS functions for the plurality of installable components. Finally, the SIAL provides a platform interface that supplies platform specific functions to the plurality of installable components.

By employing such a SIAL, software modules and drivers can employ a standard interface and thus be interchanged and updated or modified in less time using fewer programming resources. In addition, software modules and drivers can be ported to a different OS or platform with increased efficiency.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

The following commonly-assigned patent application is hereby incorporated by reference as if set forth in its entirety:

U.S. patent application Ser. No. 09/409,125 now abandoned, entitled "CHIP ABSTRACTION LAYER," filed concurrently.

Figure 1:
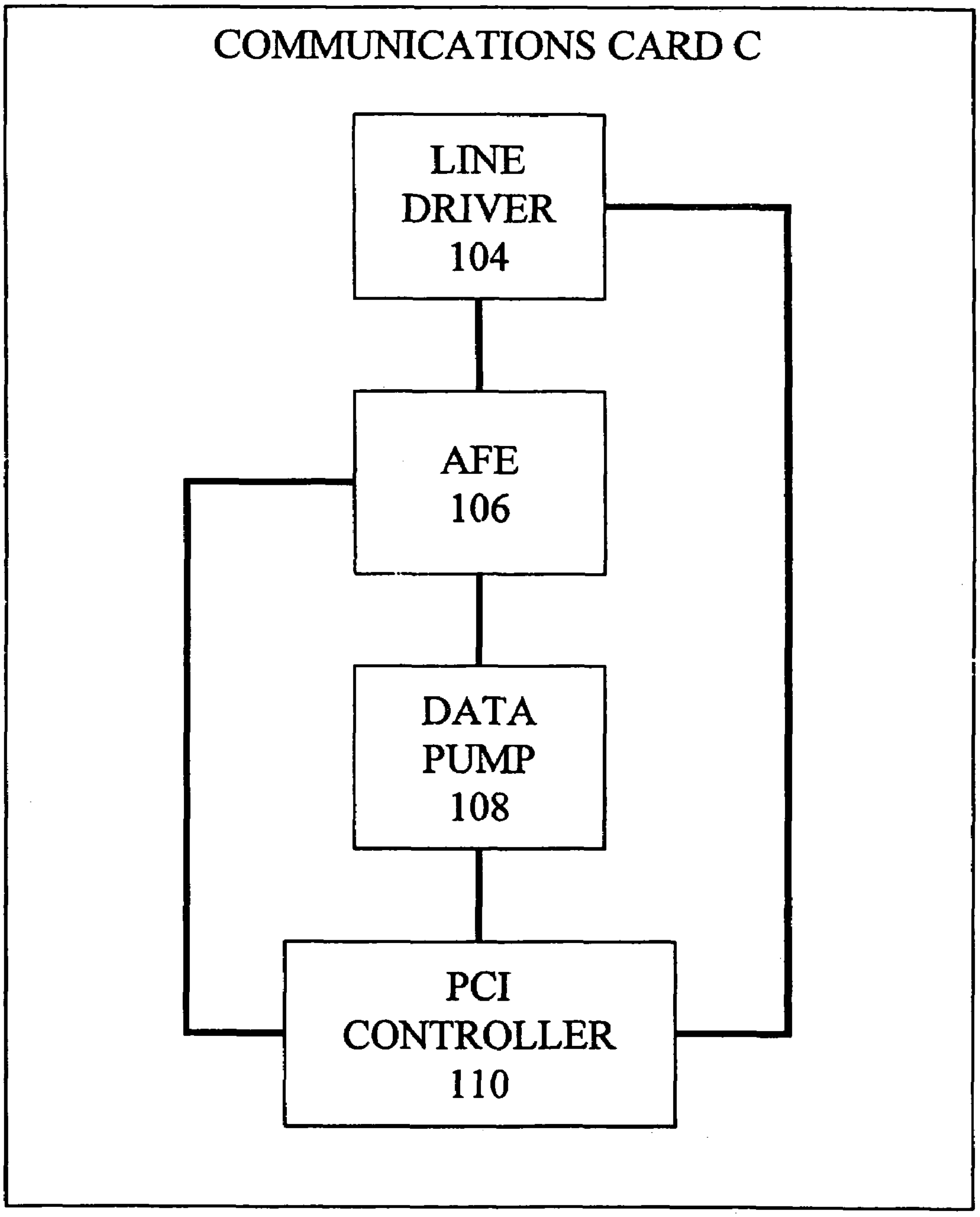
FIG. 1 is a block diagram of a exemplary communications card which can implement a system interface abstraction layer (SIAL) of the disclosed embodiment.

Turning now to FIG. 1, illustrated is an exemplary communications card or system C which may utilize the techniques of the disclosed embodiment as implemented in software on a computing system. In the alternative, the communications card may include an embedded operating system which implements the techniques of the disclosed embodiment. The communications card C includes a line driver 104, a analog front end (AFE) 106 and a data pump 108. The line driver 104 is coupled to the AFE 106, and the AFE 106 is coupled to the data pump 108. The line driver 104, the AFE 106 and the data pump 108 are each coupled to a peripheral component interconnect (PCI) bus controller 110. The communications card C can be a variety of communications devices such as a network interface card (NIC) or a modem.

It should be understood that the communications card C is used for illustration and that a number of configurations with less, more or different components are possible. The term communications card should generally be understood to include any card with modem or similar communication capability.

Figure 2A:
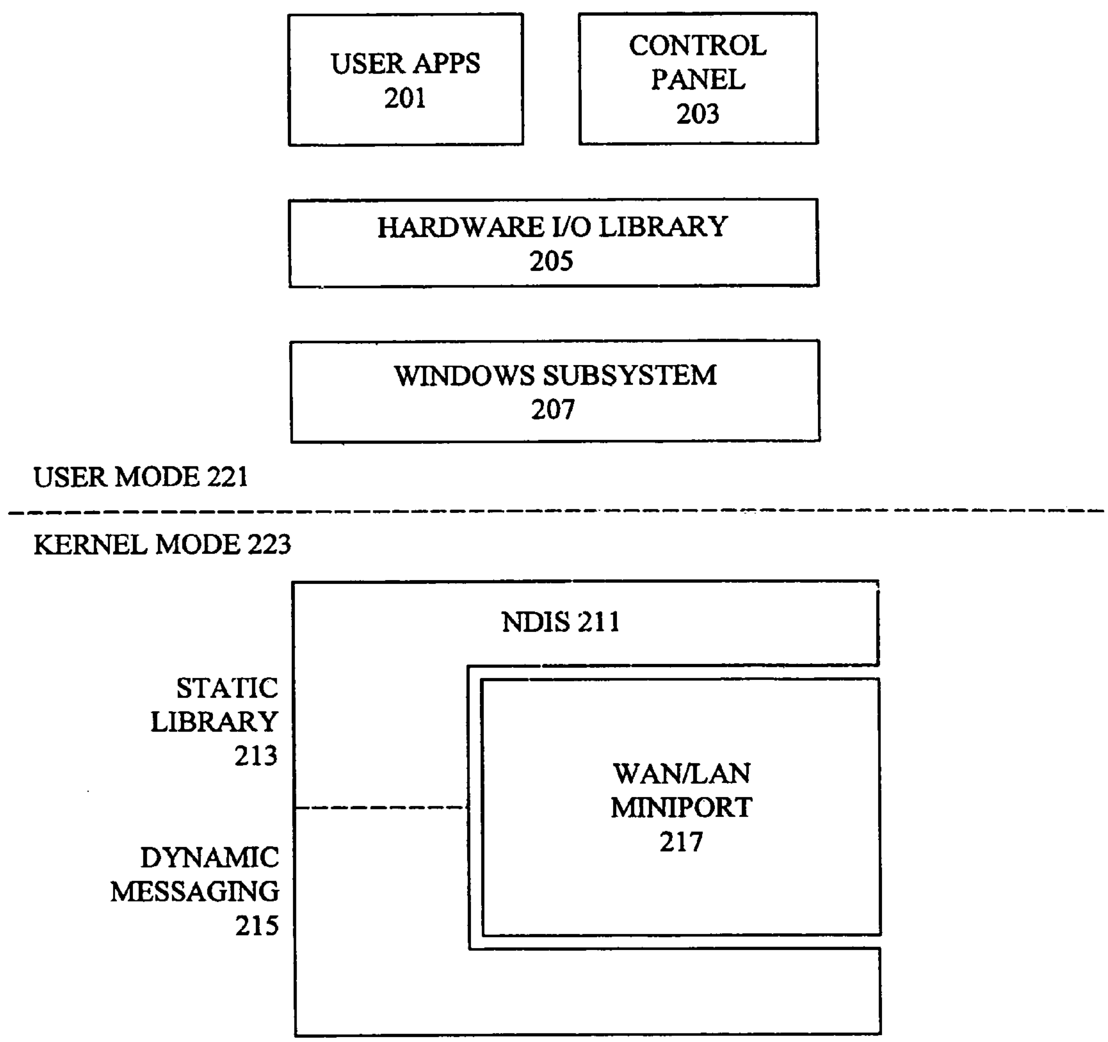
FIG. 2*a* is a block diagram illustrating a typical system/driver architecture according to the Network Device Interface Specification (NDIS)

Turning now to FIG. 2*a*, illustrated is the Network Driver Interface Specification (NDIS) "miniport" architecture model published by the Microsoft Corporation. Although the techniques of a disclosed embodiment are shown as implemented on a Windows® operating system (OS) and a NDIS platform, it should be noted that the specific OS and platform are not limiting and the disclosed techniques can be extended to other OSs and platforms.

The communications card C supports a user mode 221 and a kernel mode 223 to interface with an operating system of the card C. User mode 221 and the kernel mode 223 are generally understood in the art. The user mode 221 generally refers to low priority OS functions and the kernel mode generally refers to high priority OS functions. Included in the user mode 221 are user applications 201, a control panel 203, a hardware input/output (I/O) library 205 and a windows subsystem 207. The windows subsystem 207 can be any software entity in the Windows® architecture. One example of a windows subsystem 207 is a NDIS local area network (LAN). The kernel mode 223 includes a NDIS module (or other network driver interface) 211. The NDIS module 211 can be viewed as a combination of a static library 213 and a dynamic messaging path 215. Design and use of NDIS is generally understood in the art. A wide area network/local area network (WAN/LAN) minport driver 217 provides access to the communications card C. The design and use of miniport drivers are also understood in the art.

The NDIS architecture provides software modules a way to access the 1, communications card C regardless of the network type. In other words, a software module that communicates with the communications card C is not required to know the specific protocol of a network such as Ethernet or token ring. The NDIS module 211 abstracts the details of the network through the static library 213 and the dynamic messaging 215.

Figure 2B:
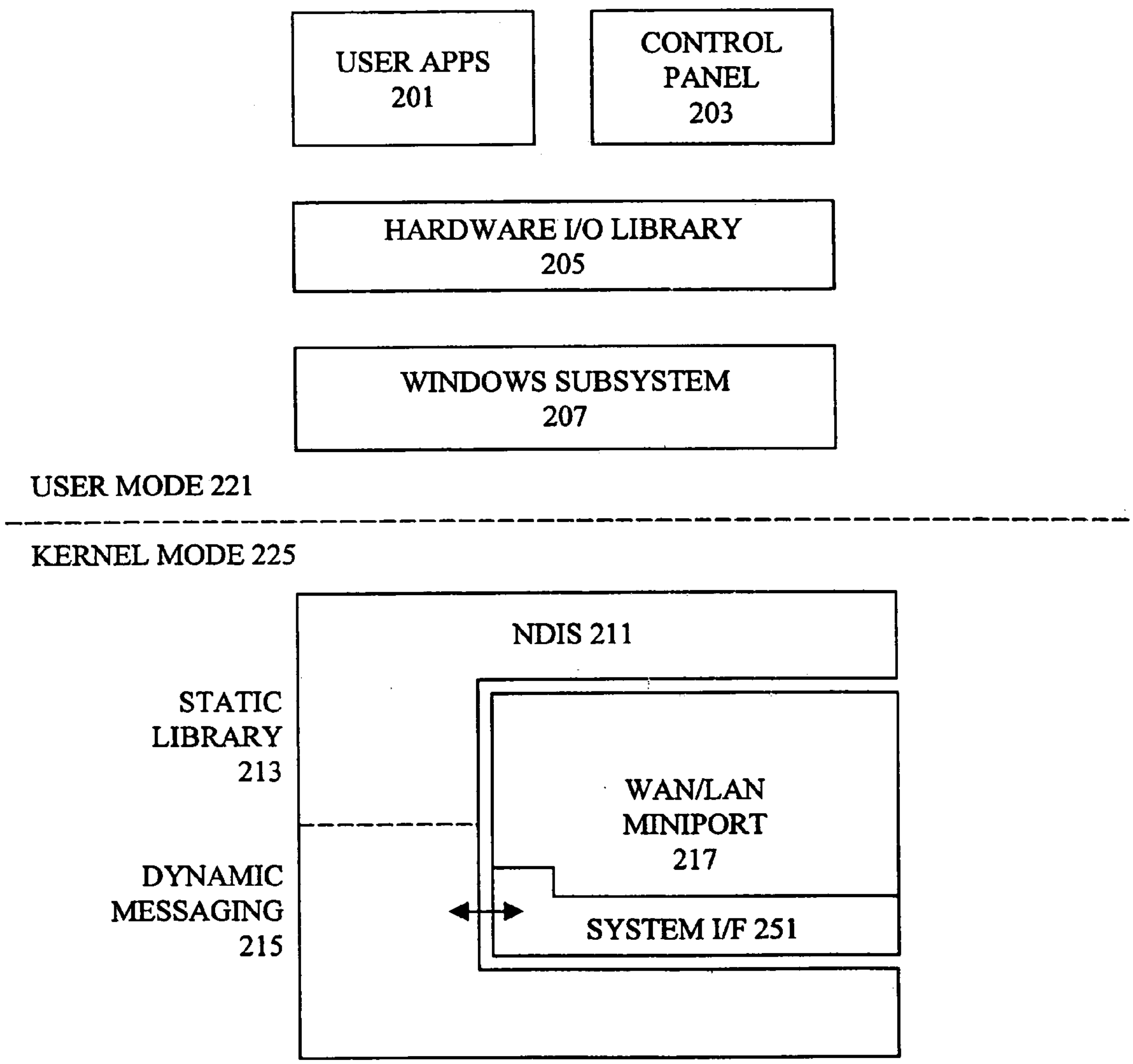
FIG. 2*b* is a block diagram of an exemplary system/driver architecture supporting the NDIS of FIG. 2*a* and the SIAL of the disclosed embodiment.

Turning now to FIG. 2*b*, illustrated is an exemplary system/driver architecture providing a system interface abstraction layer (SIAL) 251 which can be implemented by a driver such as the miniport driver 217 to access the communications card C. In this example, the NDIS 211 runs in a kernel mode 225. The SIAL 251 is a layer of software which is part of the miniport driver 217 and can be accessed from the NDIS 211. The SIAL 251 can support multiple OS and platform specific message channels for internal driver entities of the communications card C. The SIAL 251 thus provides a standard set of semantics to internal driver entities for communicating through specific message channels. Messages can be routed between an internal driver entities and external driver entities by the SIAL 251. Messages also can be routed between internal driver entities by the SIAL 251. In a disclosed embodiment, the internal driver entities are miniport driver entities and the external entities are non-miniport entities.

Figure 3:
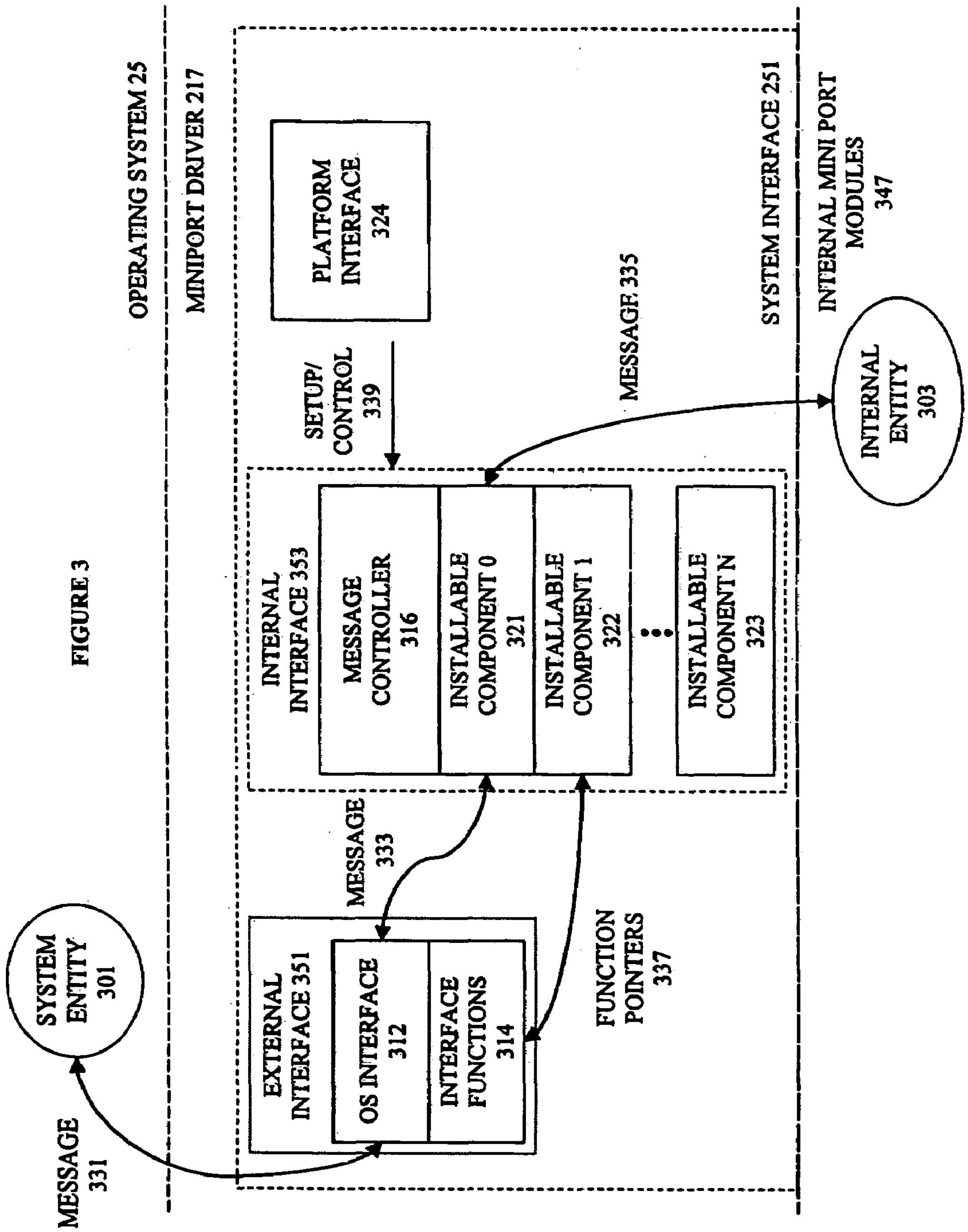
FIG. 3 is a block diagram illustrating the SIAL of FIG. 2*b* in more detail.

Turning now to FIG. 3, illustrated is SIAL 251 first introduced in FIG. 2*b*. The SIAL 251 includes an external interface 351, an internal interface 353 and a platform interface 324. As discussed above in conjunction with FIG. 2*b*, the SIAL 251 is here implemented as a software layer within the miniport driver 217.

The external interface 351 includes an OS interface 312 and interface functions 314. The external interface 351 handles the tasks associated with sending and receiving a message 331 to and from an external, or system, entity 301. The external interface 351 handles both the semantics and procedures specific to a platform or an OS. The OS interface 312 is responsible for direct communication to external driver entities such as the system entity 301 which employs software messaging. The OS interface 312 handles semantics of external driver entities such as external miniport modules described in more detail below. The OS interface 312 can access standard driver library functions of internal driver functions as described below in conjunction with the external interface 351. In addition, multiple OS interfaces (not shown) may be defined to communicate with multiple external driver entities.

The internal interface 353 handles the semantics of sending and receiving a message 335 to and from an internal driver entity 303. The internal interface 353 includes a message controller 316 and one or more installable components, an installable component 0 321, an installable component 1 322 and so on through an installable component N 323. The message controller 316 routes messages between each of the installable components 321, 322 and 323 and driver entities. As the name implies, the installable components 321, 322 and 323 are added and removed from the message controller 316 depending upon the specific software entities that seek to use the SIAL 251. The internal driver entity 303 sends and receives messages such as the message 335 directly from a corresponding installable component, in this example installable component 0 321.

The internal driver entity 303 both sends and receives messages directly to and from the message controller 316 by employing a predetermined set of functions pointers. During initialization, pointer to functions 337 are passed from the interface functions 314 to a corresponding installable component, in this example, installable component 1 322. Once the function pointers 337 have been passed to an installable component such as installable component 0 321, the installable component 0 321 can communicate with either the OS interface 351 or the internal entity 303 in any order. The functions represented by the function pointers 337 are described in detail below. An internal driver entity 303 which is able to utilize the SIAL 251 can be an internal "miniport" module 347.

In this example, the OS interface 312 interfaces with a Windows® OS 25. Additional OS interfaces may be added or substituted to provide an interface between multiple external driver entities and other OSs such as Solaris® developed by Sun Microsystems of Mountain View, Calif., LINUX written by Linus Torvalds or OS/2 developed by IBM Corporation of Armonk, N.Y. The OS interface 312 supplies pointers to OS specific interface functions 314 which form part of the installable components 321, 322 and 323. The platform interface 324 provides pointers to platform specific functions to the message controller 316. Examples of platform specific functionality include setup/control 339 and operations that occur at driver initialization time. In a manner similar to the OS interface 312, platform specific modules can be added, removed or interchanged depending upon the specific platform of the communications card C. In this way, the SIAL 251 eliminates the need to change internal modules defining the miniport driver 217 when an external interface changes. In other words, the SIAL 251 hides or isolates the requirements or semantics of external driver entities from internal driver entities of the miniport driver 217.

The platform interface 324 includes public interfaces for platform specific operations such as initialization, startup, shutdown and linking well-known handles to an instance of the SIAL 251. The platform interface 324 can encapsulate operations that are necessary to establish or destroy the external interface. Specific platforms such as a NDIS local area network (LAN) or a Win32 Driver Model (WDN) published by Microsoft may require specialized operations for the creation of the external interface. For example, in the case of NDIS, the driver uses a library function NdisMRegisterDevice to create device objects. In the alternative, a WDM driver uses a combination of an IoCreateDevice function and an IoRegisterDeviceInterface function which are functions well known in the art.

The system entity 301, running in the OS 25, can send the message 331 to the OS interface 312 which interfaces to the OS 25. The OS interface 312 processes the message 331 and sends the result as message 333 to the installable component 0 321 which corresponds to the internal entity 303 with which the system entity 301 is attempting to communicate. In this way, the message 331 is independent from both the OS 25 and the specific platform of the computing system S. A message from the internal entity 303 follows the same path in the other direction. In addition, internal entities can utilize the SIAL 251 to communicate with each other.

Messages 331, 333 and 335 contain a header section or portion and a variable length information section or portion. The header portion communicates routing information that enables the message controller 316 to move information between various entities such as the system entity 301 and the internal entity 303. The information portion contains the data that is specific to the action the target module, in this example the system entity 301, is expected to perform. The information section is opaque or masked to the message controller 316, whereas the header is considered opaque or masked to the internal entity 303. The information section does not contain data that is not directly related to the target action.

The message header is here shown as a 32-bit value. The format of the message header is defined by the following header table:

| Bit | Name | Value | Description |
|---|---|---|---|
| 0–15 | Event | Enum* | Unique Event for a specified channel |
| 16–23 | Channel | Enum* | Message Channel Identifier |
| 24–30 | Type | Enum* | Specifies a set of Message Controller 316 algorithms for a channel. |
| | Type_Data | 0 | Data Buffer does not contain embedded commands |
| | Type_Command | 1 | Buffer contains embedded commands. This requires a set of external functions to encode, decode, and store commands. |
| 31 | In_Order | Binary | Indicates messages will be passed to internal entities based on the increasing or decreasing value of Module Id. |
| | | 0 | Increasing Order |
| | | 1 | Decreasing Order |

*0 relative enumeration

An explanation of data types employed in the techniques of the disclosed embodiment is helpful to an understanding of data structures and functions described below. One skilled in the art would understand the following type definitions. A CHAN_COMMAND_T data type is defined as follows:

```
typedef struct
{
    union COMMAND_U
    {
        DWORD Command;
        struct
        {
            DWORD   Event;
            DWORD   Channel  8;
            DWORD   Type     8;
        } Element;
    };
} CHAN_COMMAND_T.
```

A FN_SYS_RECEIVE_HANDLER pointer to a function data type is defined as follows:

```
typedef
NTSTATUS   (* FN_SYS_RECEIVE_HANDLER) (
VOID       * UserContext;
CHAR       *Buffer;
DWORD      Length
).
A SYS_IF_MODULE_ID_T data type is defined as follows:
typedef enum
{
    IF_MODULE_ID_START = 0,
    IF_SYS_MGMT_ID = IF_MODULE_ID_START,
    IF_CHIPAL_ID,
    IF_DBG_TERM_ID,
    IF_MODULE_ID_END
} SYS_IF_MODULE_ID_T.
A DEVICE_CHANNEL_T data type is defined as follows:
typedef struct
{
    LIST_ENTRY        pMessage[MAX_CHAN_MESSAGES];
    DWORD             MaxMessages;
    DEVICE_OBJECT     pChannelDeviceObject;
} DEVICE_CHANNEL_T.
A DEVICE_CHANNEL_T pointer to a function data type is
defined as follows:
typedef
```

-continued

```
NTSTSTUS   (* W_QUERY_INFORMATION_HANDLER) (
    IN    VOID *    MiniportAdapterContext,
    IN    ULONG     Oid,
    IN    PVOID     InformationBuffer,
    IN    ULONG     InformationBufferLength,
    OUT   PULONG    BytesWritten,
    OUT   PULONG    BytesNeeded
    ).
```

The message header is described as the user defined data type-CHAN _COMMAND_T. This type is used by the message controller 316. Internal driver modules view the header as the opaque value SYS_MESS_T. The multiple views of the same data are intended to help enforce the architecture implemented by the entire SIAL 251.

The contents of the information section are not defined for the message controller 316. The information is an opaque data set transported across a specified channel. An internal or external entity includes a buffer to store information. The property of the buffer understood by the message controller 316 is the overall length in bytes.

An internal interface 353 of the SIAL 251 includes a SmSysIfAddMessageHandler module, a SmSysIfGetHandle module, a SmSysIfSendMessage module and a SmSysIf- BroadcastMessage module, all described in more detail below. The modules of the internal interface, or "internal modules," that process a specified message indicate the amount of data they expect to modify. This value is known as the Buffer Length. When the message controller 316 receives a new message from the external entity 301, the message controller 316 ensures the new message contains the necessary storage space based upon a calculated sum of all Buffer Length requirements as indicated by all the internal modules of the SIAL 251.

The internal driver modules access the message controller 316 from the internal interface 353. The internal interface 353 provides a set of function calls that allow modules or entities to bind a function to a specified message, send messages to an external entity, or broadcast a message to all internal driver modules.

The function, SmSysIfAddMessageHandler, is used to bind a call back function in an internal driver module to an occurrence of a message on specified message channel. The function includes the following parameters:

| | |
|---|---|
| VOID | * SysIfContext; |
| SYS_MESS_T | MessageHeader; |
| DWORD | Length; |
| FN_SYS_RECEIVE_HANDLER | ReceiveHandler; |
| VOID | * FunctionContext; |
| SYS_IF_MODULE_ID_T | ModuleId. |

The SysIfContext parameter of a VOID pointer data type is a handle to an instance of the SIAL 251. SysIfContext is provided as an output from the SmSysIfGetHandle function described below. Typically, there is one SysIfContext for each instance of a driver. The MessageHeader parameter of a SYS_MESS_T data type is an opaque message identifier that uniquely identifies a message and a message channel. The values of the MessageHeader parameter are defined above in the message header table. The Length parameter of a DWORD data type identifies the amount of data in an information buffer that an internal module can modify when the message controller 316 delivers a message. If an information buffer is not modified, then this value should be set to '0'. The ReceiveHandler parameter of FN_SYS_RECEIVE_HANDLER data type is a pointer to a routine called by the message controller 316 when a new message is received. The FunctionContext parameter of VOID pointer data type is an internal module context delivered by the message controller 316 as a parameter in the ReceiveHandler function call. The FunctionContext parameter is an opaque value to the message controller 316 but can be viewed by the internal driver modules. Typically an internal module supplies a local context value in this argument. The ModuleId parameter of SYS_IF_MODULE_ID_T data type identifies a relative position of the internal driver module in relation to all other modules in the driver architecture. This value is used to create an ordered driver call stack. A typical usage is to create a data stack. Modules are placed in the data stack according to their ModuleId.

The function, SmSysIfGetHandle, returns a context handle to the message controller 316. One handle is associated with each instance of the miniport driver 217. The SmSysIfGetHandle module includes the following parameters:

| | |
|---|---|
| IN VOID | * pThisAdapter; |
| OUT VOID | ** Handle. |

The pThisAdapter parameter of VOID pointer data type is a pointer to a global instance of a driver and is relative to the context of the internal driver module. The Handle parameter of VOID pointer to pointer data type is a pointer to a pointer to the message controller 316 associated with the pThisAdapter context.

The function, SmSysIfSendMessage, sends a message from an internal driver entity to an external entity. This function is used to communicate with other drivers or with the user applications 201 and includes the following parameters:

| | |
|---|---|
| VOID | * SysIfContext; |
| SYS_MESS_T | MessageHeader; |
| CHAR | * Buffer; |
| DWORD | Length. |

The SysIfContext parameter of VOID pointer data type is a pointer to a handle to an instance of the SIAL 251. This parameter is provided as an output from the SmSysIfGetHandle module. Typically, there is one SysIfContext for each instance of a driver. The MessageHeader parameter of SYS_MESS_T data type is an opaque message identifier that uniquely identifies a message and a message channel. The values of the MessageHeader parameter are defined in the message header table described above. The Buffer parameter of a CHAR pointer data type is a pointer to a data area containing data to be transmitted across the message channel indicated by MessageHeader paramteter. The Length parameter of DWORD data type is the length in bytes of the data area pointed to by the Buffer parameter.

The function, SmSysIfBoradCastMessage, sends a message from a single internal driver module to all other driver modules registered for a specific message. This function can be used to communicate a global driver event or to create a protocol stack within the miniport driver 217. The SmSysIfBoradCastMessage module includes the following parameters:

| | |
|---|---|
| VOID | * SysIfContext; |
| SYS_MESS_T | MessageHeader; |
| CHAR | * Buffer; |
| DWORD | Length. |

The SysIfContext parameter of VOID pointer data type is a handle to an instance of the SIAL 251. This is provided as an output from the SmSysIfGetHandle function. Typically, there is only a SysIfContext for each instance of the miniport driver 217. Again; the MessageHeader parameter of SYS_MESS_T data type is an opaque message identifier that uniquely identifies a message and a message channel. The values of the MessageHeader parameter are defined in the message header table described above. The Buffer parameter of CHAR pointer data type is a pointer to a data area containing data to be transmitted across the message channel indicated by MessageHeader parameter. The Length parameter of DWORD data type is the length in bytes of the data area pointed to by the Buffer parameter.

The external interface of the SIAL 251 supports the following functions: a FN__EXTERNAL__SEND__HANDLER function, a FN__ADD__MODULE function, a FN__GET__HANDLER__LIST function and a SmSysIfSetDevice function. These functions are utilized by the message controller 316.

For each external entity such as the system entity 301, the format of a data message is specific to that entity. Therefore, a translation may be necessary in order to communicate software messages between modules or entities. The translation functions are here the responsibility of the external modules.

The FN__EXTERNAL__SEND__HANDLER function can perform translations and route a message from an internal driver enity to an external driver entity. This function is called by the internal interface function SmSysIfSendMessage. In the case where a message channel is being used to communicate internally within the miniport driver 217, this function is optional. The FN__EXTERNAL__SEND__HANDLER function includes the following parameters:

| | |
|---|---|
| IN PDEVICE__OBJECT | pDeviceObj; |
| IN CHAR | * Buffer; |
| IN DWORD | Length. |

The pDeviceObj parameter of a PDEVICE__OBJECT data type is a pointer to an device object that describes a driver interface to the OS 25. Miniport drivers do not always supply the DEVICE__OBJECT as an input parameter to the miniport. Therefore, the message controller 316 maintains a global list of interfaces. This list is used to match various external handles to the device object pointed to by the pDeviceObj parameter. The Buffer parameter of CHAR pointer data type is a pointer to a data area containing data to be transmitted across to the external entity. The Length parameter of DWORD data type is the length in bytes of the data area pointed to by the Buffer parameter.

The FN__ADD__HANDLER function associates a callback function with a unique message on a specified message channel and includes the following parameters:

| | |
|---|---|
| IN DEVICE__CHANNEL__T | * pChan; |
| IN CHAN__COMMAND__T | Message; |
| IN DWORD | Length; |
| IN FN__SYS__RECEIVE__HANDLER | ReceiveHandler; |
| IN VOID | * Context; |
| IN SYS__IF__MODULE__ID__T | ModuleId. |

The pChan parameter of DEVICE__CHANNEL__T pointer data type is a context pointer that describes the properties of a message channel within the message controller 316. The Message parameter of a CHAN__COMMAND__T data type uniquely identifies a message and a message channel. The values of the Message parameter are defined in the message header table described above. The Length parameter of DWORD data type indicates the number of bytes a callback function will return when a new message is received. This value can be '0' if the callback routine does not modify the message. The ReceiveHandler parameter of FN__SYS__RECEIVE__HANDLER data type is a callback function provided by an internal driver module. The callback function can be invoked when the message specified by the Message parameter is received from the message channel specified by the Message parameter. The Context parameter of VOID pointer data type is meaningful to an internal driver module in that the parameter is returned to the ReceiveHandler routine when a new message arrives. The ModuleId parameter of SYS__IF__MODULE__ID__T data type can be used by the message controller 316 to determine a call order of an associated CallBack functions. Each message can be associated with multiple callback routines. In such a case, the order in which the CallBack routines are invoked may be significant. If so, the ModuleId parameter can be an integer that reflects the increasing order of a call tree. Otherwise, the value can be '0'.

The FN__GET__HANDLER__LIST function can retrieve a callback function list from an external module associated with a specific message channel and includes the following parameters:

| | | |
|---|---|---|
| IN | DEVICE__CHANNEL__T | * pChan; |
| IN | CHAN__COMMAND__T | Message; |
| OUT | LIST__ENTRY | ** ppMessageList. |

The pChan parameter of DEVICE__CHANNEL__T pointer data type is a context pointer that describes the properties of a message channel within the message controller 316. As in other functions, the Message parameter of CHAN__COMMAND__T data type uniquely identifies a message and a message channel. The values of the Message parameter are defined in the message header table described above. The ppMessageList parameter of a LIST__ENTRY pointer to pointer data type is a pointer to a pointer to the head of a callback function list. If an external module is unable to associate the message specified by the Message parameter to an external message, then this value can be '0'.

The SmSysIfIndicateNewMessage function can indicate that a new message is available from the system entity 301 and includes the following parameters:

| | | |
|---|---|---|
| IN | PDEVICE__OBJECT | pDevice; |
| IN | DWORD | ExternMessage; |
| I__O | CHAR | * Buffer; |
| IN | DWORD | Length. |

The pDevice parameter of PDEVICE__OBJECT data type is a pointer to a device object that describes a driver interface to the OS 25. Miniport drivers are not required to supply the device object as an input parameter to a miniport. Therefore, the message controller 316 maintains a global list of possible interfaces used to match various external handles to the device object. The ExternMessage parameter of DWORD data type can indicate a specific message and message channel that is available. The Buffer parameter of CHAR pointer data type points to a data area containing the message from an external entity. The contents of the message are specific to an action or data that is being requested. The data area does not contain overhead information that is specific to a message channel. In the miniport driver 217, a final recipient of a message understands or modifies the data area pointed to by the Buffer parameter. The Length parameter of DWORD data type can contain the length in bytes of the data area.

The SmSysIfSetDevice function can associate an external message channel with an instance (context) of the miniport driver 217 and includes the following parameters:

| | | |
|---|---|---|
| IN | PDEVICE_OBJECT | pDeviceObj; |
| IN | CHAN_COMMAND_T | Message; |
| I_O | PDEVICE_OBJECT | UserDevice. |

Like pDevice, the pDeviceObj parameter of PDEVICE_OBJECT data type is a pointer to an object that describes a driver interface to the OS 25. The Message parameter of CHAN_COMMAND_T data type indicates a message channel that will be associated with a miniport context. The UserDevice parameter of PDEVICE_OBJECT data type is a handle as viewed from the external entity associated with the Message channel. In the minport driver 217, the external entity is a NDIS adapter context.

Exemplary public functions of the platform interface 324 include a SmWdmIfInit function, a SmWdmIfShutdown function, and a SmKernelLoadHandlers function. The public function, SmWdmIfInit, creates an instance of the SIAL 251 and includes the following parameters:

| | |
|---|---|
| IN PDRIVER_OBJECT | DriverObject; |
| IN VOID | * UserContext; |
| IN PDEVICE_OBJECT | PhysicalDeviceObject; |
| IN PUNICODE_STRING | RegistryPath; |
| W_QUERY_INFORMATION_HANDLER | QueryHandler. |

The DriverObject parameter of PDRIVER_OBJECT data type is a miniport DriverObject used to create one or more device objects. Typically, there is one device object for each instance of the miniport driver 217. The UserContext parameter of VOID pointer data type is a handle used to associate a pseudo global handle (NDIS adapter context) to the instance of the SIAL 251 being created. This allows other internal driver modules to determine the context of the SIAL 251 associated with a well-known driver handle by using the SmSysIfGet Handle function. The PhysicalDeviceObject parameter of PDEVICE_OBJECT data type is a physical device object for an instance of the miniport driver 217. This is an optional parameter used by WDM drivers to create a WDM System Interface. For the NDIS miniport model, this parameter is unused and should be set to NULL. The RegistryPath parameter of a PUNICODE_STRING data type is a path to a miniport driver's vendor specific registry key. The key can be used to override default public symbolic link names and setup optional configuration parameters for the SIAL 251. The QueryHandler parameter of W_QUERY_INFORMATION_HANDLER data type is an optional function pointer that identifies an internal driver function that is capable of parsing standard NDIS Query Information handler calls. A Return Value parameter is returned to the SIAL 251. A successful initialization will return a non-zero handle. A initialization failure will result in a NULL (zero) return value.

The SmWdmIfShutdown function destroys an interface created by the public function, SmWdmIfInit function and includes the following parameter:

VOID * SysIfContext

The SysIfContext parameter of VOID pointer data type is the handle returned by the public function, SmWdmIfInit function. This parameter is a pointer to the SIAL 251 that is being terminated.

The SmKernelLoadHandlers function queries the SIAL 251 for a driver object MajorFunction table and includes the following parameter:

I_O PDRIVER_OBJECT DriverObject.

The DrierObject parameter of PDRIVER_OBJECT data type is a pointer to a driver object major function table which is modified to reflect the entry points required for the SIAL 251.

The OS interface 312 supports a limited public set of driver modules. This set is accessed directly by other SIAL 251 files and is private to all other driver modules.

A SmWdmIfLoadHandlers function obtains a list of dispatch table entries from the public interface module and includes the following parameter:

IN PDRIVER_DISPATCH * DispatchTable.

The DispatchTable parameter of a PDRIVER_DISPATCH data type enables major function points to be added to a dispatch table.

A SmWdmIfUnLoadHandlers function is used to release any resources that were allocated by a previous call to theA SmWdmIfLoadHandlers function and includes the following parameter:

IN DEVICE_EXTENSION * pDevExt.

The pDevExt parameter of a DEVICE_EXTENSION data type is pointer to a device extension context used by the SIAL 251.

A SmWdmIfSetDeviceParams function is an initialization routine that is called to set any device object flags that cannot be set by the platform interface 324. The flags indicate a device object is ready to process system requests. The SmWdmIfSetDeviceParams function includes the following parameter:

IN PDEVICE_OBJECT pDeviceObject.

The pDeviceObject of PDEVICE_OBJECT data type is a pointer to device object created by the SmWdmIfInit function.

By employing such a SIAL, software modules and drivers can employ a standard interface and thus be interchanged and updated or modified in less time using fewer programming resources. In addition, software modules and drivers can be ported to a different OS or platform with increased efficiency.

A chip abstraction layer (ChipA1) is described in a commonly assigned U.S. patent application Ser. No. 09/409,125 now abandoned, entitled "CHIP ABSTRACTION LAYER", previously incorporated by reference. The system interface abstraction layer and the chip abstraction layer may be implemented in a single driver where the hardware abstraction layer is a lower level driver and the system interface abstraction layer is an upper level driver.

The foregoing disclosure and description of the various embodiments are illustrative and explanatory thereof, and various changes in the details of the illustrated apparatus and construction and method of operation including the number and the order of the processing steps may be made without departing from the spirit of the invention.

I claim:

1. A communications driver on a communications card comprising:

a network driver interface; and a miniport driver coupled to the network driver interface, the miniport driver comprising:

a system interface abstraction layer (SIAL) comprising:

an operating system (OS) interface to process a plurality of messages for a plurality of internal driver entities; and a message controller coupled to the OS interface to transfer the plurality of messages.

2. The communications driver of claim 1, the SIAL further comprising:

a platform interface coupled to the message controller for providing platform specific information and commands to the message controller.

3. The communications driver of claim 1, wherein the message controller communicates with the OS interface through functions.

4. The communications driver of claim 1, the message controller further comprising:

a plurality of message channels, each message channel for communicating a subset of the plurality of messages to and from a corresponding subset of the plurality of internal devices to a specific external device.

5. The communications system driver of claim 4, wherein the message controller comprises a plurality of installable components corresponding to the plurality of message channels.

6. The communications system driver of claim 5, wherein the plurality of installable components comprise function pointers corresponding to functions in the OS interface.

7. The communications driver of claim 1, the OS interface comprising:

an external interface for communicating with the plurality of external entities.

8. The communications system driver of claim 1, the network driver interface further comprising:

a dynamic messaging library coupled to the SIAL.

9. The communications system driver of claim 1, wherein each message of the plurality of messages comprises a message header portion containing routing information for the message controller and a message information portion containing data related to an action for a target entity to perform.

10. The communications system driver of claim 9, wherein a message header comprises an event variable to indicate a unique event for a corresponding message channel and a message channel identifier variable to indicate the corresponding message channel.

11. A communications card, the communications card comprising: a communications system driver comprising:

a network driver interface;

a miniport driver coupled to the network driver interface; and a system interface abstraction layer (SIAL) coupled to the network driver interface and the miniport driver, the SIAL comprising:

an operating system (OS) interface for processing a plurality of messages to and from a plurality of entities internal to the OS; and a message controller coupled to the OS interface for translating the messages and routing the message to and from an entity external to the OS.

12. The communications card of claim 11, the SIAL further comprising:

a platform interface coupled to the message controller for providing platform specific information and commands to the message controller.

13. The communications card of claim 11, wherein the message controller communicates with the OS interface through functions.

14. The communications card of claim 11, the message controller further comprising:

a plurality of message channels, each message channel for communicating a subset of the plurality of messages to and from a corresponding subset of the plurality of internal devices to a specific external device.

15. The communications card of claim 14, wherein a message header comprises an event variable to indicate a unique event for a corresponding message channel and a message channel identifier variable to indicate the corresponding message channel.

16. The communications card of claim 14, wherein the message controller comprises a plurality of installable components corresponding to the plurality of message channels.

17. The communications card of claim 16, wherein the plurality of installable components comprise function pointers corresponding to functions in the OS interface.

18. The communications card of claim 11, the OS interface comprising:

a external interface for communicating with the plurality of external entities.

19. The communications card of claim 11, the communications card further comprising:

a dynamic messaging library coupled to the SIAL.

* * * * *